March 5, 1946.  V. P. HARVEY ET AL  2,395,813
POWER TRANSMISSION DEVICE
Filed Aug. 12, 1943   2 Sheets-Sheet 1

INVENTORS
Valentine Pearce Harvey
James Arthur Mason
BY Loyd Hall Sutton
ATTORNEY March 5, 1946. V. P. HARVEY ET AL 2,395,813
POWER TRANSMISSION DEVICE
Filed Aug. 12, 1943 2 Sheets-Sheet 2

INVENTORS
Valentine Pearce Harvey
James Arthur Mason
BY Loyd Hall Sutton
ATTORNEY Patented Mar. 5, 1946

2,395,813

UNITED STATES PATENT OFFICE 2,395,813

POWER TRANSMISSION DEVICE

Valentine Pearce Harvey and James Arthur Mason, Deptford, England, assignors to Molins Machine Company Limited, London, England Application August 12, 1943, Serial No. 498,423
In Great Britain July 16, 1942

4 Claims. (Cl. 192—8)

This invention concerns improvements in or relating to power transmission devices and refers to a device which has to be started and stopped at intervals, and in which the stopping is required to be effected at predetermined times, e. g. when a moving machine part reaches a certain position.

The objects of the invention include means whereby the device is brought rapidly to rest by means of a friction brake or equivalent device.

According to the present invention there is provided a power transmission device comprising a driving device and a driven device which are so arranged that when the supply of power to the driving device is cut off, the driven device overdrives the driving device, means for cutting off the power supply to the driving device at a predetermined time, a friction brake comprising a fixed friction element and a rotatable friction element to co-operate therewith, the rotatable friction element being mounted for rotation with an axially movable member and co-operating faces (e. g. inclined co-operating faces) on the driving and driven devices whereby the axially movable member is moved axially to apply the brake when the driven device overdrives the driving device.

Further according to the present invention there is provided power transmission gearing comprising a driving device and a driven device, a gear train coupling said devices, means for stopping the power supply to the driving device, and a brake for bringing the gearing to rest, said brake being caused to operate by relative movement between a gear on the driving side and a gear on the driven side due to the reversal of the direction of the tooth pressure when the power supply to the driving device is stopped.

For convenience, the term "gear train" used herein means any two or more gears forming a driving train and further the term "gear" includes the rack.

In one form of the device, the toothed gearing employed is of the kind wherein the reaction due to the tooth pressure causes an axial thrust on a shaft carrying a gear; for example bevel gearing, spiral and worm gearing.

Further according to the present invention there is provided power transmission gearing comprising a driving device and a driven device, a gear train coupling said devices, means for stopping the power supply to the driving device and a brake for bringing the gearing to rest, said brake being caused to operate by axial movement of a gear on the driving side due to the axial thrust set up consequent upon the reversal of the direction of the tooth pressure when the power supply to the driving device is stopped.

The driving device may comprise any source of mechanical power, such as an electric or other motor, or any sort of engine or a shaft or the like mechanically rotated and provided with a friction clutch or similar device whereby the drive to the driving side of the gear may be stopped.

One way of carrying the invention into effect will be described with reference to the accompanying drawing which shows an example of power transmission gearing where the source of power comprises an electric motor and the gearing consists of a worm forming a driving member and a worm-wheel forming a driven member.

Figure 1:
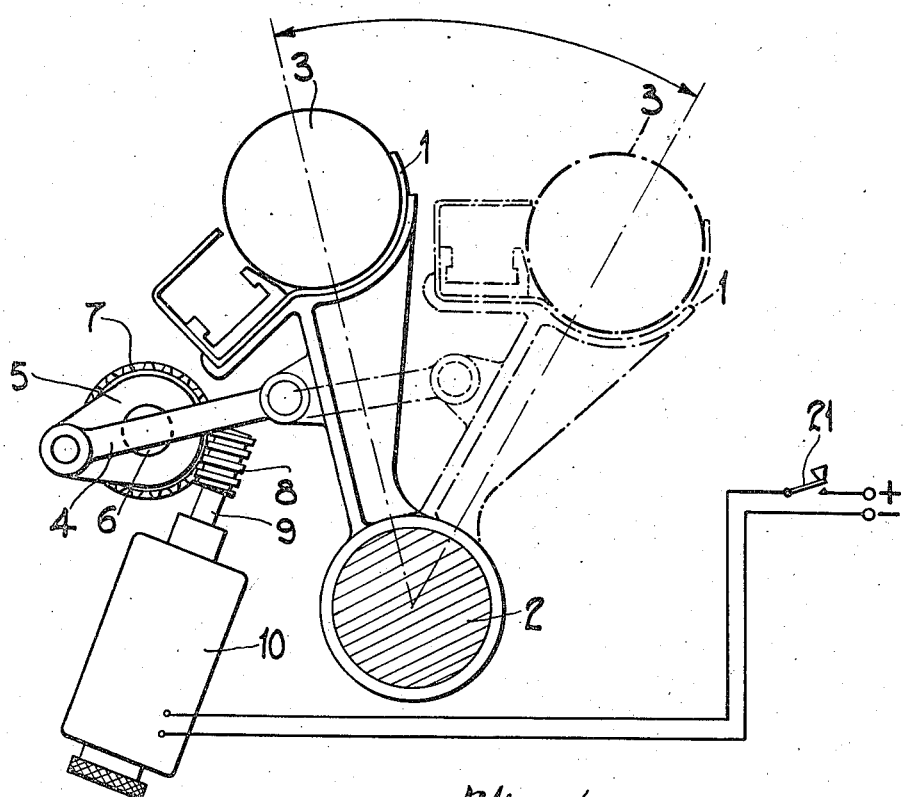
Figure 1 is a diagram showing an electric motor oscillating a loading tray to and fro from a loading position to a ramming position to convey a shell into alignment with the breech of a gun.

Referring to Figure 1, the loading tray 1, which is oscillated about a fixed pivot 2, is shown supporting a shell 3 and it will be appreciated that the tray and shell together form a mass of considerable weight and it is therefore desirable to stop the drive to the tray some time before the tray brings the shell into alignment with the breech of the gun, the final movement being effected by the inertia of the heavy moving mass. In the diagram the loading tray is shown in full lines in the position where it receives the shell, and in chain lines in the ramming position where the shell is in alignment with the breech of the gun.

The tray 1 is coupled by a connecting rod 4 to a crank 5 which is fixed on a shaft 6 on which is also fixed a worm-wheel 7 of the power transmission device, and a worm 8 which engages with said wheel is coupled to the armature shaft 9 of an electric motor 10 by a driving dog, key, spline or the like, so that the worm shaft can move axially although the driving engagement between the armature shaft and the worm shaft is still maintained.

The current to the motor 10 may be interrupted by any suitable switching device. An automatic arrangement is described in United States patent application Serial No. 488,453, but for the purpose of describing the present invention a simple hand switch 21 is shown.

Figure 2:
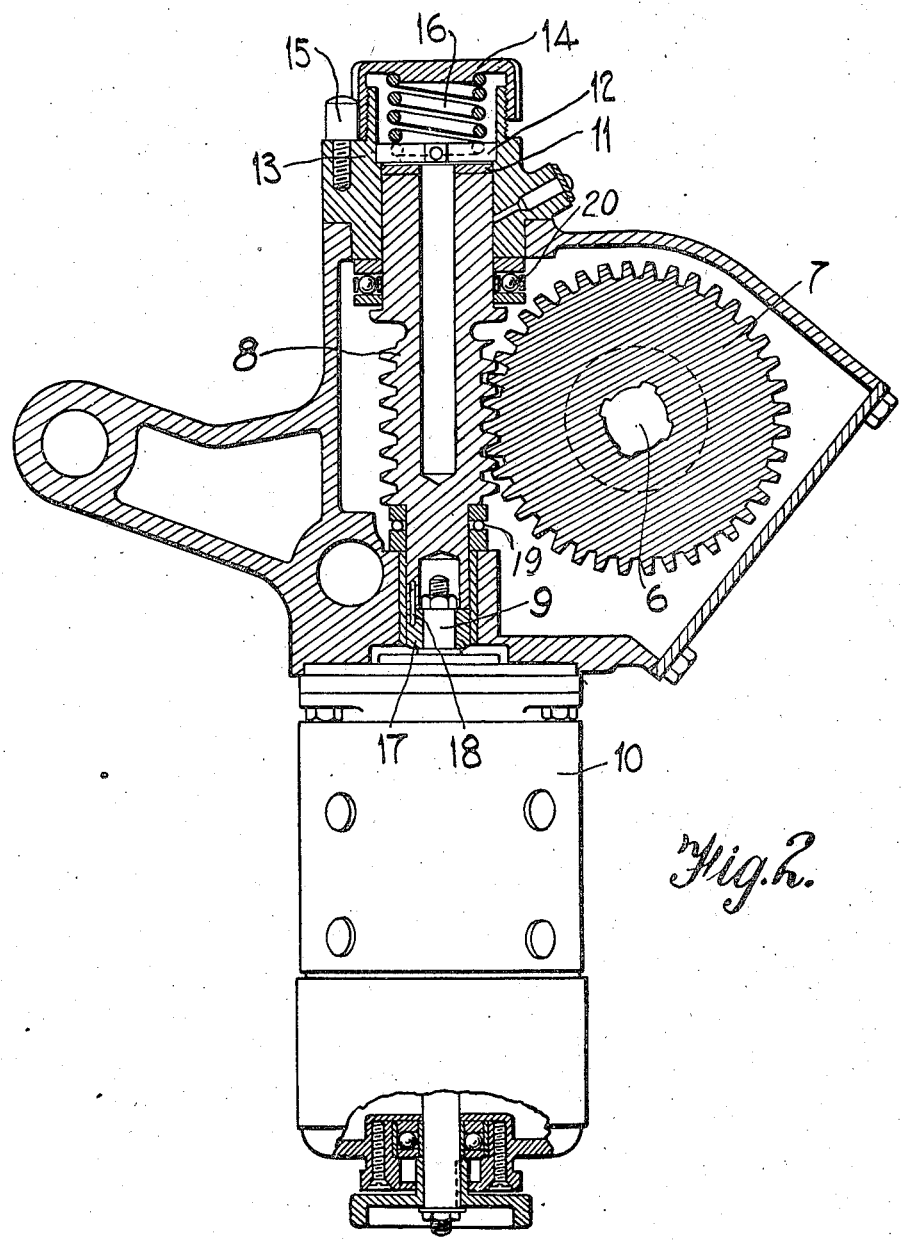
Figure 2 is an elevation of an electric motor and the worm gearing, the latter being shown in section.

Referring to Figure 2, at the upper end of the worm 8 on the motor shaft 9 there is provided a friction brake, comprising a friction washer 11 mounted on the end of the worm and engaging a friction disc 12 which is prevented from rotation by being keyed to the bush 13 which surrounds the shaft. This bush is threaded on its exterior and a corrugated hand nut 14 can be screwed up or down on it. The nut, when adjusted, is fixed in position by a pin 15. Between the interior face of the hand nut and the friction washer there is arranged a compression spring 16 so that as the nut is screwed up or down the degree of braking pressure is varied. The function of the brake is to stop the motor as soon as possible after the current is cut off. The brake, however, is not operative while the current to the motor is flowing but comes into operation immediately the current ceases. This operation is effected automatically in the following manner:

The worm 8 is, as aforesaid, connected to the armature shaft but the connection is such that the worm can move lengthwise with respect to such shaft. As shown in Figure 2 a small collar 17 is fixed on the end of the armature shaft and in practice the end of the worm is connected to this collar by means of a key, but as the drawing is so small the connection is shown as a pin 18 which is fixed in the collar and extends into a hole in the journal of the worm, so that the worm can move lengthwise and away from the end of the shaft.

At a predetermined time before the tray reaches either of its stationary positions the current to the tray motor is cut off. As aforesaid the loading tray (and the round, if the tray is loaded) form a mass of considerable weight and the final movement of the tray is effected by the inertia of the heavy moving mass.

When the motor is driving the worm and worm-wheel and moving the loading tray, the thrust due to the reaction between the thread of the worm and the tooth of the worm-wheel is such that it can be met by a thrust race 19. When the current to the motor is cut off, the tray will continue to move onwards due to its inertia and thus the worm-wheel will tend to overdrive relatively to the worm and the direction of pressure between the worm thread and the worm-wheel tooth is reversed. The worm is therefore moved axially although it is still coupled to the armature shaft by the driving pin 18. The axial movement of the worm will cause the friction members of the brake to engage with a degree of pressure determined by the spring 16 and the adjustment thereof by the cap 14. Another thrust race 20 is shown at the opposite end of the worm but when the motor is driving the worm-wheel there is a small space between the flange on the worm and the collar of the thrust race. This space is of about .050" in thickness, and before it is taken up by the axial movement of the worm, the brake is brought into effective operation, but the thrust race forms a fixed abutment to limit the extent of axial movement of the worm.

It will be seen that any sort of gearing in which the reaction due to the tooth pressure between a driving and a driven gear causes an axial thrust on the driving shaft may be employed in a similar manner to the specific embodiment described. Where other types of gearing are used, such for example as ordinary spur gearing having straight (i. e. not spiral) teeth, it will be understood that there is a similar reversal of the direction of the tooth pressure when the driving motor or other device is stopped, and consequently there is a slight relative movement between the two gears which may be suitably employed to actuate a brake as in the previous case, but generally speaking gears of the kind which set up an axial thrust are more suitable for employment with the invention.

The invention is of very great importance when used in connection with the stopping and positioning of a crank driven loading tray for a heavy anti-aircraft gun since it is necessary to ensure that the positions into which the loading tray is brought are accurately determined on each movement of the tray. For instance, when moving a shell over in front of the breech it is very important that the tray should come to rest with the shell properly aligned with the breech; and again when the tray is swung over into a position to avoid the recoil, it is very important to ensure that the tray shall not rebound so that it can come in the way of the recoiling breech.

As will be seen in Figure 1, the parts in chain lines show the loading tray in a position where it is supposed to be aligned with the breech, and in that position the crank and connecting rod are both in the same straight line. If, in such a case, the tray was stopped by engagement with a fixed stop instead of using the present invention, there would be some rebounding of the tray away from the stop owing to the heavy mass. This would cause the crank to continue to turn and thereafter it would then be impossible to bring the tray up against its stop. Likewise when the tray is returned to be out of the way of the recoiling breech, if the tray is stopped by impact against some abutment the tray would bounce back and so might be a cause of collision between the tray so misaligned and the recoiling breech.

By means of the present invention the parts are brought to rest when the crank is in a dead-centre position on each stroke and the switch 21 is so operated that the current will be stopped at a point prior to the crank reaching its dead-centre position. The timing of the breaking of the current is related directly to the time taken to cause the friction brake to bring the parts to rest. The time taken to bring the parts to rest is found to be fairly constant, although it is advisable to make fresh adjustments for different atmospheric or temperature conditions. By stopping the driven elements at positions where the crank is in a dead-centre position, it is possible to ensure that the extreme positions occupied by the tray remain substantially constant.

It will be understood that although the fixed friction element 12 is held in position by a spring and can therefore move in the direction of the thrust of the shaft 8, it is, nevertheless, a fixed friction element in so far as it is the fixed member of two cooperating braking elements. Again instead of having the brake arranged in the manner shown, many other modifications could readily be made. For instance, the axially movable member 8 could be provided with an external brake surface and the axial movement of the member 8 could be arranged to move a suitable linkage carrying brake blocks which are caused to engage said external surface of the axially movable member 8. The brake blocks which engage the friction material on the axially movable member 8 are in this instance also fixed friction elements, since they are fixed when the brake is being applied and the term "fixed friction element" is therefore to be deemed to include such elements.

What we claim as our invention and desire to secure by Letters Patent is:

1. A power transmission mechanism including a driving device and a driven device comprising a worm and worm wheel, means mounting said worm for axial movement to provide for axial displacement of the worm when power is cut off from the driving device and the worm wheel overdrives the worm, and cooperating friction elements associated with that end of the worm from which the worm moves away when driving the worm wheel and toward which it is moved upon reversal of pressure between the worm and worm wheel when the worm wheel overdrives the worm to actuate said friction elements and brake the driven device.

2. A power transmission mechanism according to claim 1 having one of said friction elements mounted for rotation with said worm.

3. A power transmission mechanism according to claim 1 having an abutment associated with the relatively stationary friction element and a spring cooperating with said relatively stationary friction element and urging the same axially toward said worm and against said abutment.

4. A power transmission mechanism according to claim 1 including a spring for urging one of said friction elements toward the other and means for adjusting the tension of said spring to predetermine the braking action required for bringing the parts to rest in a given time.

VALENTINE PEARCE HARVEY.
JAMES ARTHUR MASON.